Nov. 22, 1960 H. C. GREEN 2,961,054
HYDRAULIC CULTIVATING TOOL
Filed May 21, 1956 2 Sheets-Sheet 1
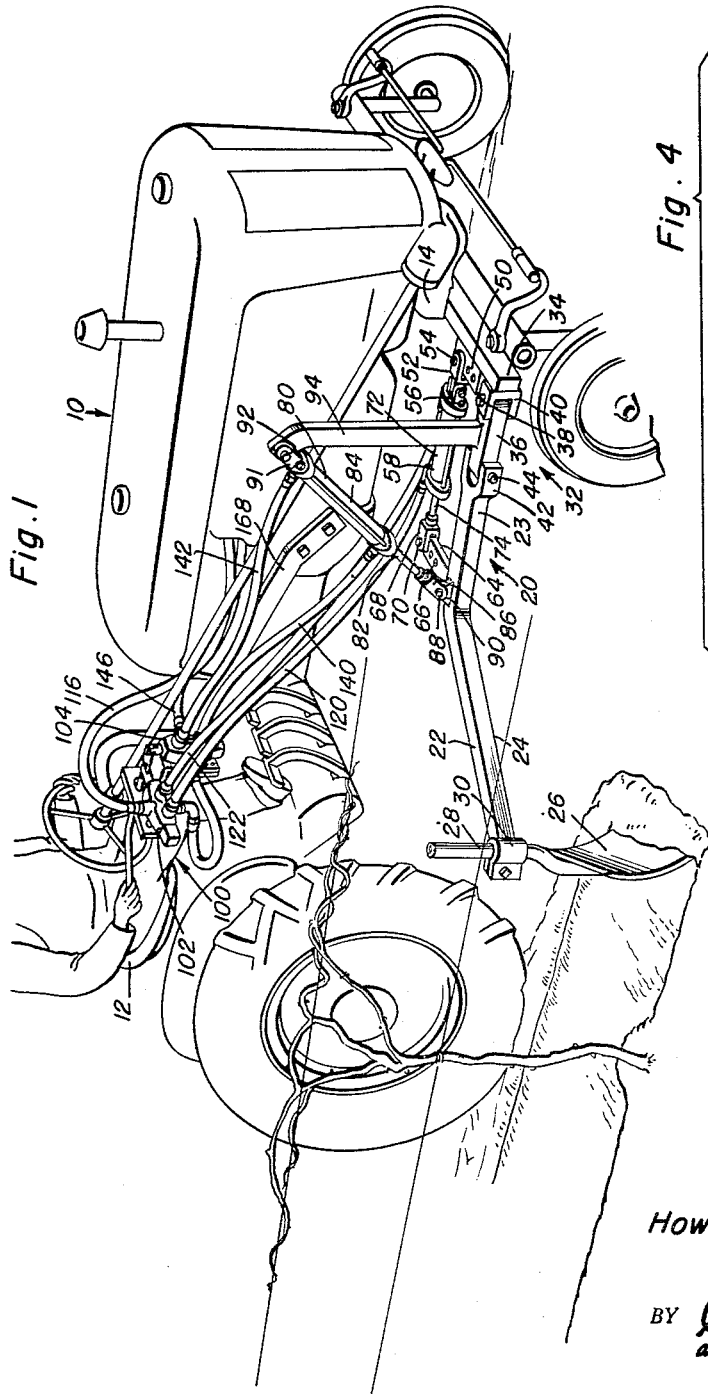
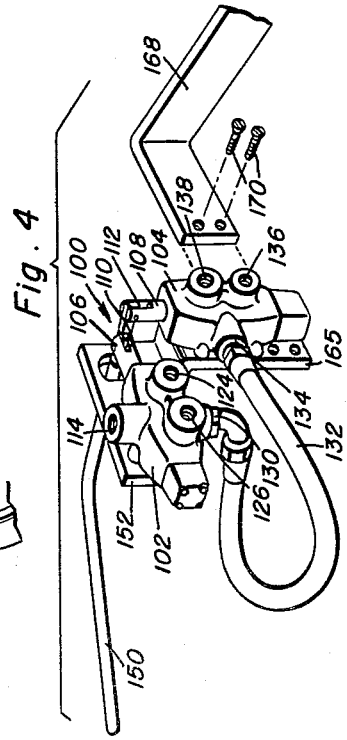
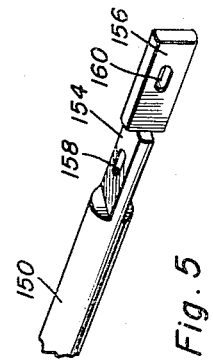
Howard C. Green
INVENTOR.

Howard C. Green
INVENTOR.

United States Patent Office 2,961,054
Patented Nov. 22, 1960

2,961,054

HYDRAULIC CULTIVATING TOOL

Howard C. Green, W. Main Road, Portland, N.Y.

Filed May 21, 1956, Ser. No. 586,168

19 Claims. (Cl. 172—305)

This invention relates to cultivating attachments for tractors and particularly to a hoe that has special, although not exclusive, utility in grape vineyards.

In the past, attempts have been made to provide tractor drawn attachments or implements for facilitating the earth working operation around grape vines and other plants. The majority of such implements are manually operated making it quite difficult for the tractor driver to both manipulate the tractor controls and apply the necessary manual force to hold the implement in a proper path. Mechanical aids such as latches have been resorted to in trying to alleviate the large expenditure of effort required of the tractor driver. Although they have been of some help, these aids are only that, namely aids and do not completely solve the problem.

An object of the present invention is to provide a tractor attachment which requires a very minimum of effort on the part of the tractor operator, this effort being multiplied by fluid pressure applied to motors in the implement so that the tractor operator need expend only a minimal effort in adjusting the earth working tool either in a vertical direction for biting deeper into the soil or shallower, depending on his judgment, or laterally of the tractor in order to avoid direct contact with the plantings.

A further object of the invention is to provide a novel frame for an earth working tool beam, this frame having in it a link pivoted at one end about a first axis and pivotally connected to the beam at the other end for motion that is constrained to an axis that intersects the first axis, the beam having attached to it a fluid motor, e.g. a double acting hydraulic cylinder, the fluid motor reacting on the link and arranged to lift and lower the beam about the second mentioned axis, and the beam having a second fluid motor, e.g. another double acting hydraulic cylinder, also attached to it and reacting on the stationary part of the frame in order to move the link and hence the beam about the other axis, whereby all of the movements that are necessary for the tractor operator are attainable at the beam which supports the earth working tool.

A further object of the invention is to provide a control system for the above mentioned fluid motors or for other motors, this control system having a pair of four-way valves having stems which are arranged at right angles to each other and a single control handle or an equivalent, the handle being secured to both of the stems of the valves so that it too is movable about intersecting axes. In this way, movement of the handle in any direction will cause a corresponding movement of the earth working tool supporting beam, but due to the fluid pressure available in the motor and control system, the beam is moved with a much greater force than required in operating the valve handle. A far more natural control of the earth working tool is obtained in the utilization of this control system where the tractor operator moves a handle in the precise direction that he desires the earth working tool to be moved.

Another object of the invention is to provide a practical and more easily operative grape hoe that is adapted to be secured to the side of an ordinary farm tractor and utilize the hydraulic power take-off of the tractor in order to move the hoe both vertically and horizontally with a minimum of control effort required of the tractor operator.

A further object of the invention is to provide such an attachment without the necessity of altering the standard tractor, the attachment being designed to be fastened to the tractor drawbar or other suitable part and to connect with the tractor hydraulic power take-off from which it derives its motivating forces.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a perspective view of a tractor of conventional form, the tractor having an attachment which is constructed in accordance with the principles of the invention, mounted operatively thereon, this view showing the attachment in use;

Figure 4 is an exploded perspective view of the valves and control handle for the valves constituting a portion of the attachment in Figure 1; and Figure 5 is a fragmentary perspective view of the inner end of the handle showing a part of the lost motion connections between the valve stems and the handle.

Figure 2:
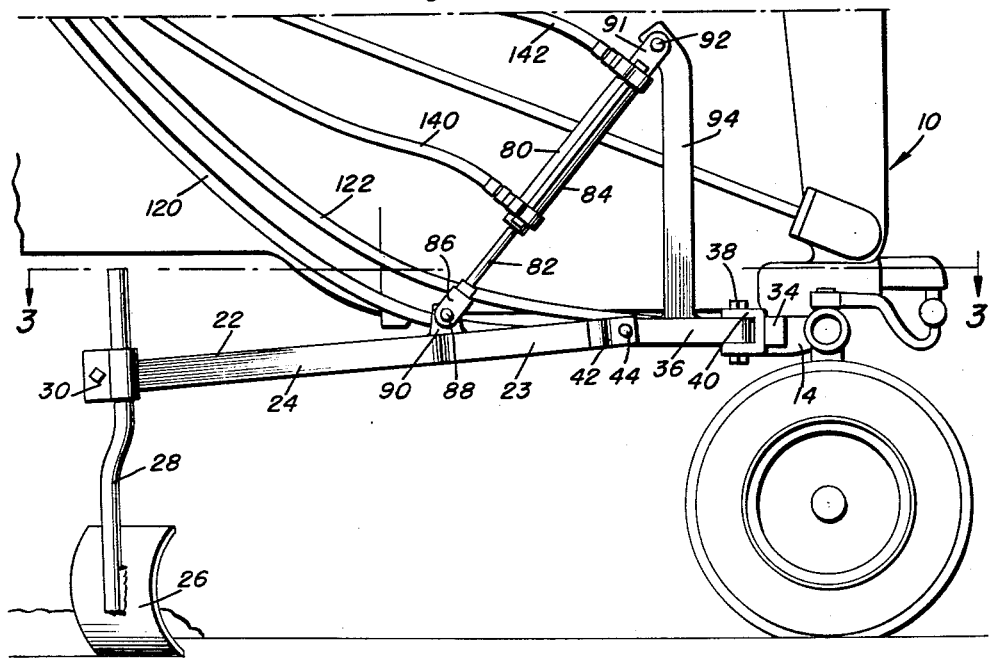
Figure 2 is a fragmentary side view of the attachment in Figure 1.
Figure 3:
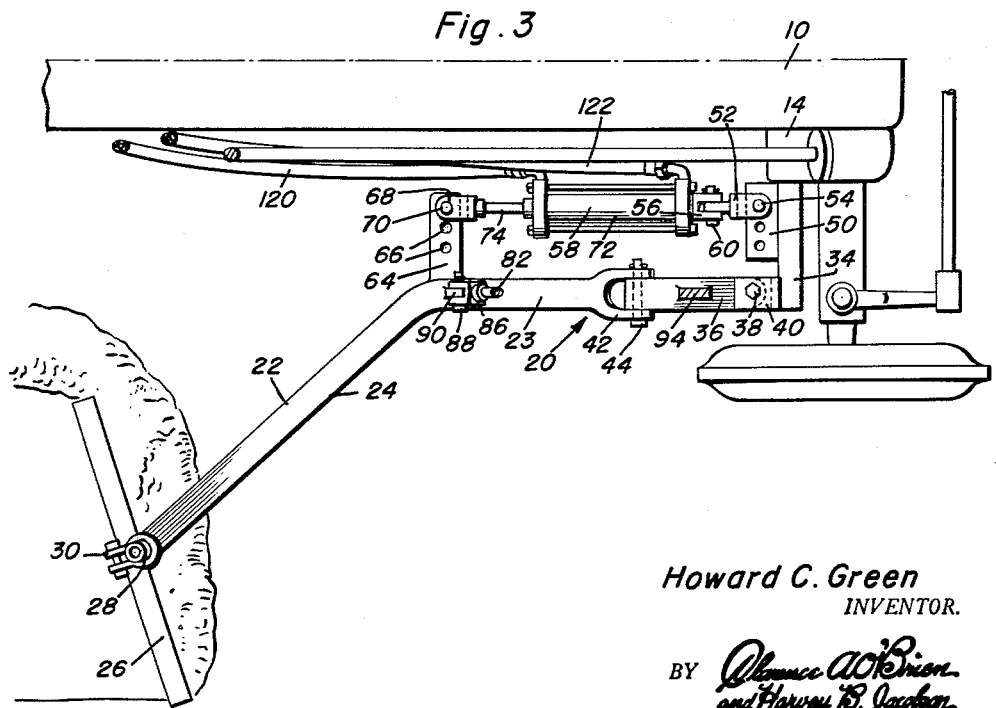
Figure 3 is a sectional view taken approximately on the line 3—3 of Figure 2.

Tractor 10 in Figure 1 is a commercially available vehicle that is provided with various structural components, for example wheels, a chassis, an engine, seat 12, front drawbar 14 and a hydraulic power take-off unit that is provided with inlet and outlet terminals. The tractor attachment 20 consists of an implement that has a beam 22 formed of an inner part 23 and an outer part 24 arranged at an angle to the inner part 23. The angularity is to position the earth working tool 26 laterally outwardly from the wheels of the tractor when the front section 23 is arranged approximately parallel to the line of travel of the tractor. Inasmuch as the attachment 20 is designed primarily to be used in vineyards, the earth working tool 26 is depicted as being a hoe, but it is appreciated that this hoe may be substituted by a number of other types of earth working tools. Shank 28 is attached to the earth working tool 26 and is passed through clamp 30 on the outer extremity of beam 22, this exemplifying one structural means for attaching the earth working tool to the beam 24.

The beam is operatively connected with and in a sense, forms a part of a frame 32 which is fastened to the tractor drawbar 14. Frame 32 has a bar 34 which is bolted or otherwise secured to the drawbar 14. Link 36 is operatively connected to the bar 34 by means of a pivot connection. This pivot connection includes a pivot pin 38 arranged in an approximately vertical plane in order to establish a vertical axis of pivotal movement for link 36. A U-shaped bracket 40 is welded or otherwise rigidly fixed to bar 34 and opens rearwardly. The front end of link 36 is disposed between the parallel sides of the U-shaped bracket 40 and has an opening in it through which the pin 38 is passed. This pin, passing through aligned apertures in the bracket 40, mounts the link 36 for movement in a horizontal plane, but the pivotal movement of the link is constrained to this plane and about the vertical axis established by pin 38.

The rear end of link 36 is attached to the front section 23 of beam 22. This section has furcations 42 that are apertured in order to accommodate pivot pin 44. This pivot pin is passed through an opening in the link 36 and is at approximately right angles to the pin 38. This establishes an axis of pivotal movement for the beam 22 which is perpendicular to the axis of pivotal movement of link 36, and due to the furcations 42, the pivotal motion of the beam 22 is constrained to vertical movement when the frame 32 is in an approximately horizontal position as shown in Figure 1.

Bar 34 may be provided with a number of openings, or, these openings may be formed in a rearwardly extending plate 50 that is welded or otherwise rigidly fixed to the bar 34. The openings are to selectively accommodate bracket 52 which is swingable about pin 54 that holds it attached to the plate 50. Another bracket 56 is secured to the second fluid motor 58 and has a pivot pin 60 connecting it to a tongue which protrudes from bracket 52, pin 60 being at right angles to the pin 54. This arrangement provides a universal movement connection for the fluid motor 58. The opposite end of the fluid motor is connected to a bracket 64 that protrudes laterally from the beam 22 and has a plurality of apertures 66 in it. A generally U-shaped bracket 68 is secured to the fluid motor 58 and has a pivot pin 70 passed through aligned openings in it and through a selected opening 66 in bracket 64. The selectivity of apertures 66 in bracket 64 and the apertures in plate 50 provides for a selective effective stroke of the fluid motor 58 by relocating the fluid motor in accordance with the desires of the user of the attachment 20. This increases or decreases the speed of operation of the hoe beam.

The second fluid motor 58 is made of a cylinder with a piston in it, cylinder 72 together with piston rod 74 being of standard construction. Another hydraulic motor 80, arbitrarily termed the first hydraulic motor, has a piston rod 82 and a cylinder 84 in which the piston is operable. Piston rod 82 is formed with a U-shaped bracket 86 at its extremity, the latter having a pivot pin 88 passed through aligned openings in it and also through aligned openings in the upstanding bracket 90 which is welded or otherwise rigidly fixed to beam 22. The cylinder 84 has a similar bracket 91 fixed to its opposite end, pin 92 passing through aligned openings in it and also through an opening that is formed in the reaction arm 94. This arm is fixed to link 36 providing on the link 36 a point of reaction when the fluid motor is extended, causing pivotal motion of the beam 22 about the axis established by pivot pin 44.

Control means for the fluid motors are arranged at a location convenient to the hand of the operator of the tractor. Control means 100 comprise a pair of four-way valves 102 and 104 respectively. Valves 102 and 104 have reciprocable stems 106 and 108 mounted therein, each stem having an outwardly opening slot 110 and 112 respectively at its end. Valve 102 has an inlet port 114 to which conductor 116 is connected, this conductor also being connected at its opposite end to the hydraulic power take-off outlet terminal of tractor 10. Flexible conductors 120 and 122 are connected to outlets 124 and 126 respectively of valve 102 and to the cylinder of second fluid motor 58 on opposite sides of the piston thereof.

When valve stem 106 is set in a neutral position the fluid flows freely through valve 102 and returns in a like manner through valve 104 to the inlet port of the hydraulic power take-off of the tractor. In taking this path the fluid flows through conduit 132 that interconnects parts 130 and 134 of valves 102 and 104, and from valve 104 to the hydraulic power take-off through conduit 146. Movement of stem 106 to the right as viewed by the tractor driver (Figure 1) diverts the flow under pressure into conduit 122 and hence to the head of the cylinder of motor 58. At the same time this opens a port in the valve 102 allowing the fluid at the opposite end of motor 58 to be expelled back through conduit 120, valve 102, conduit 132, valve 104 and conductor 146 to the tractor hydraulic power source inlet port. When stem 106 is returned to the neutral position the fluid in the double acting cylinder that forms motor 58 is locked holding the piston in its position. When stem 106 is moved in the opposite direction the operation of piston of motor 58 is just the reverse.

Fluid conduits 140 and 142 are attached to the ports 136 and 138 of valve 104 and to the opposite ends of the double acting cylinder that forms fluid motor 80. Accordingly, the operation of valve stem in valve 104 causes the motor 80 to function in the manner described in connection with motor 58 and its valve 102.

A single means is operatively connected to each of the valve stems 106 and 108 in order to simultaneously actuate them. Due to the disposition of the valves, that is one valve having its axis perpendicular to the other, movement of the single means, handle 150 in the illustrated instance, may be made to correspond in direction to the movement of the beam 22 that results from energization of the first and second fluid motors. Handle 150 is passed through an opening in mounting bracket 152 and is formed with two flats 154 and 156 in which slots 158 and 160 are formed. These slots have pins passed through them and through aligned openings in the outer extremities of the valve stems 106 and 108 respectively. Flats 154 and 156 are at right angles to each other and are fitted in the slots formed at the extremities of the valve stems. Inasmuch as the valve stems are capable of rotation without changing the settings of the valves 102 and 104, movement of the handle 150 to the left or right will cause actuation of the motor 58 which adjusts the position of beam 22 laterally of the tractor. During this movement of handle 150, the valve stem 108 idles in a rotative manner in the valve 104. Upon movement of the handle in the up and down direction, the valve stem 106 rotates idly while the valve stem 108 is reciprocated in order to change the setting thereof. This causes a resulting actuation of fluid motor 80 to elevate or depress the beam 22.

Mounting bracket 152 comprises a plate with an offset 165 accommodating valve 104, valve 102 being mounted directly on the plate 152, as by being bolted. A support 168 is attached to the offset 165, as by bolts 170, this support being adapted to be secured to a part of the tractor 10.

In operation the farmer becomes seated on the tractor and drives down the rows of the vineyard. He manipulates the handle 150 upward and downward or sideways depending on how he wishes the beam 22 to be deflected. This beam supports the earth working tool 26 at the outer extremity and must be adjusted in accordance with ground irregularities, soil densities, weed growth and the various positionings of the various plants.

When it is desired to elevate the beam 22, the tractor operator lifts the handle 150 upwardly, thereby causing the valve 104 to be operated in such a manner that the fluid under pressure from the tractor hydraulic power take-off flows through pipe 140 and returns through pipe 142 thereby elevating the beam 22. Then the handle is returned to the neutral position stopping this flow of fluid and holding the fluid motor 80 in a locked position. Moving the handle downward causes a reverse motion of the beam through operation of the motor 80. Moving the handle to the left or the right causes fluid to flow through the conduits that feed and exhaust from the second fluid motor 58 in order to apply a lateral force to the beam 20.

When beam 22 is raised or lowered, this is accomplished by pivotally actuating the beam about the pin 44 as an axis of pivotal motion. At the same time the fluid motor 58 pivots about the axis of pin 60 thereby offering no interference to this adjusting motion. To move the tool and its support beam 22 laterally of the tractor, the fluid motor 58 is energized causing link 36 and every link supported by it to move laterally about the pivot axis established by pin 38.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A cultivator attachment for a tractor, said attachment comprising a frame which has a bar adapted to be secured to the tractor and protrude from the side thereof, a link secured to said bar and arranged to move about an approximately vertical axis, a cultivator supporting beam, means securing an end of said beam to said link for pivotal movement about an approximately horizontal axis, means connected to said beam and bar for moving said beam about said vertical axis, and means connected to said beam for adjusting said beam about said horizontal axis and holding said beam against up and down movement.

2. A cultivator attachment for a tractor that has a hydraulic power take-off, said attachment comprising a frame which has a bar adapted to be secured to the tractor and protrude from the side thereof, a link secured to said bar and arranged to move about an approximately vertical axis, a cultivator supporting beam, means securing an end of said beam to said link for pivotal movement about an approximately horizontal axis, means actuated by said hydraulic power take-off and connected to said beam and bar for moving said beam about said vertical axis, a reaction arm fixed to said link, means connected to said arm and to said beam for adjusting said beam about said horizontal axis and holding said beam against up and down movement, a control valve for each of said beam moving means, and a single handle connected to actuate each valve so that said beam is raised or lowered in response to raising or lowering said handle and said beam is moved inwardly or outwardly in response to a corresponding movement of said handle.

3. A cultivator implement comprising a bar which is adapted to be secured to a tractor, a link, means pivotally connecting said link to said bar, a cultivator supporting beam, means pivotally connecting said beam to said link, means including a first fluid motor to lift said beam and hold said beam against up and down movement, a reaction arm fixed to said link, means pivotally securing the ends of said motor to said arm and said beam, a second fluid motor to move said beam and link and arm laterally, and means pivotally connecting said second motor to said beam and said bar.

4. A cultivator implement comprising a bar which is adapted to be secured to a tractor, a link, means pivotally connecting said link to said bar, a cultivator supporting beam, means pivotally connecting said beam to said link, means including a first fluid motor to lift said beam and hold said beam against up and down movement, means pivotally securing the ends of said motor to said link and said beam, a second fluid motor to move said beam laterally, and means pivotally connecting said second motor to said beam and said bar, said beam to link pivotal connecting means including a pivot pin, said link to bar pivotal connecting means also including a pin, and said pins being arranged at right angles to each other.

5. A cultivator implement comprising a bar which is adapted to be secured to a tractor, a link, an arm fixed to said link, means pivotally connecting said link to said bar, a cultivator supporting beam, means pivotally connecting said beam to said link, a first fluid motor to lift said beam and hold said beam against up and down movement in selected positions of adjustment, and connected to said arm and to said beam, a second fluid motor to move said beam laterally, means pivotally connecting said second motor to said beam and said bar, said beam to link pivotal connecting means including a pivot pin, said link to bar pivotal connecting means also including a pin, said pins being arranged at right angles to each other and separated by said link to which said arm is fixed, a first valve arranged to control said first motor, a second valve arranged to control said second motor, and conductors connecting said valves and said motors.

6. An earth working implement adapted to be mounted on a tractor and including an earth working tool located to the side of the tractor, said implement comprising a link, means at one end of said link for pivotally securing the link to the tractor for pivotal movement about an approximately vertical axis, an arm fixed to said link and protruding laterally from the link, a beam to which said earth working tool is secured, means at one end of said beam pivotally securing said beam to the opposite end of said link for pivotal movement about an approximately horizontal axis, the fixed juncture between said arm and said link being between said ends of said link, a first fluid motor connected to said arm and to said beam for holding said beam against up and down movement while said earth working tool is functioning to work the soil and also for adjusting said beam in a generally up and down direction by pivoting said beam about the pivotal connection between said beam and said link, means including a second fluid motor for moving said beam laterally, means pivotally connecting said second motor to said beam and said bar, said beam to link pivotal connecting means including a pivot pin, said link to beam pivotal connecting means also including a pin, said pins being arranged at right angles to each other and separated by said link to which said arm is fixed, a first valve arranged to control said first motor, a second valve arranged to control said second motor, conductors connecting said valves and said motors, and a single means to actuate said valves selectively or in unison.

7. The implement of claim 6 wherein each valve is a four-way valve with a stem movable to actuate the valve, said valves being arranged with their stems at right angles to each other, said single means comprising a handle pivoted to each of said stems at spaced places on the handle.

8. In an implement, a cultivator supporting part mounted for movement about spaced axes in approximately perpendicular planes, fluid actuated means for moving said part about said axes, control means operatively connected to said fluid actuated means and including a pair of valves that have axially movable and rotatable stems at right angles to each other, and a single means pivotally attached to both of said stems and arranged to move in a path which corresponds to the movement of said part about said axes to actuate said valves.

9. In an implement, a cultivator supporting part mounted for movement about spaced axes in approximately perpendicular planes, fluid actuated means for moving said part about said axes, control means operatively connected to said fluid actuated means and including a pair of valves, a single means arranged to move in a path which corresponds to the movement of said part about said axes to actuate said valves, said single means comprising a handle, said valves having axially movable and rotatable stems, and lost motion connections between said stems and said handle.

10. In an implement, a cultivator supporting part mounted for movement about spaced axes in approximately perpendicular planes, fluid actuated means for moving said part about said axes, control means operatively connected to said fluid actuated means and including a pair of valves that have axially movable and rotatable stems at right angles to each other, and a single means pivotally attached to both of said stems and arranged to move in a path which corresponds to the movement of said part about said axes to actuate said valves, said fluid actuated means comprising a first and a second fluid motor, conductors extending from said valves to said motors in order to establish fluid flow therebetween, and means including frame members to which said part and said motors are operatively connected.

11. In an implement, a beam mounted for movement about spaced axes in approximately perpendicular planes, fluid actuated means for moving said beam about said axes, control means operatively connected to said fluid actuated means and including a pair of valves, a single means arranged to move in a path which corresponds to the movement of said beam about said axes to actuate said valves, said fluid actuated means comprising a first and a second fluid motor, conductors extending from said valves to said motors in order to establish fluid flow therebetween, means including a frame to which said beam and said motors are operatively connected, means for attaching an earth working tool to the end of said beam, said frame having a bar, a link, an approximately vertical pivot connecting said link to said bar, and an approximately horizontal pivot connecting said beam to said link.

12. The implement of claim 11 wherein there is a reaction arm fixed to said link, one of said motors is pivotally secured to said beam between its ends and to said bar, and the other of said motors is pivotally connected to said beam between its ends and to said reaction arm.

13. A control for a cultivator supporting part which is adjustable about spaced axes in approximately perpendicular planes, said control comprising a first and a second valve, each valve having a control member, each member having a stem, said stems arranged at essentially the same angle as is made by said intersecting axes, said stems each being movable longitudinally and rotatively, a single control lever, means directly pivotally connecting a first part of said lever to one of said stems, and means directly pivotally connecting another part of said lever which is longitudinally spaced from said first part of said lever to the other of said stems so that said lever is capable of swivel motion to impart longitudinal movement to either of said stems or simultaneously to both stems.

14. The control of claim 13 wherein said stems of said control members are mounted in spaced parallel planes.

15. The control of claim 13 wherein said stems of said control members are mounted in spaced parallel planes, said control members consist of valves, and at least one mounting bracket supporting said valves.

16. A control for a cultivator supporting part which is adjustable about spaced axes in approximately perpendicular planes, said control comprising a first and a second control member, each member having a stem, said stems arranged at essentially the same angle as is made by said planes containing said spaced axes, said stems each being movable longitudinally and rotatively, a single control lever, means pivotally and directly connecting a part of said lever to one of said stems, means pivotally and directly connecting another part of said lever which is longitudinally spaced from said first part of said lever to the other of said stems so that said lever is capable of swivel motion to impart longitudinal movement to either of said stems or simultaneously to both stems, said means connecting said lever to both of said stems comprising a pin and slot in each stem and lever.

17. In an implement which has a cultivator supporting beam adapted to support the cultivator and adapted to move upwardly, downwardly, laterally and in combinations of these movements, the improvement comprising a link, a first pivot connecting one end of said link to said cultivator supporting beam, means including a second pivot whose axis is in a plane which intersects the axis of the first pivot for supporting the opposite end of said link, an arm fixed to said link intermediate said first and second pivot, means attached to said arm and said beam to adjust said beam to a selected fixed position about said first pivot, and means connected to said beam for laterally adjusting said beam by moving said beam, said arm and said link about the axis of said second pivot thereby adjusting said beam.

18. In a cultivator implement which has a beam adapted to support a cultivator and which is adapted to mount on a tractor drawbar and utilize the tractor hydraulic system, the combination of a cultivator supporting beam, a link pivoted by means of an approximately horizontal pin at one end of said beam, an approximately vertical pivot connecting said link to the drawbar of the tractor, a bracket fixed to said beam and protruding laterally from the beam between the ends of the beam, a fluid motor attached to said bracket and the drawbar, means to couple said fluid motor to the hydraulic system of the tractor, control means operatively associated with said coupling means in order to apply fluid under pressure into said motor and thereby swing said beam in a horizontal plane and about the approximately vertical pivot pin as an axis.

19. The combination of claim 18 wherein there is an upright secured to said link, a fluid motor attached to said upright and said beam, hydraulic hose connections between the last mentioned fluid motor and said control so that upon application of fluid under pressure from the tractor hydraulic system, said beam is raised and lowered about the generally horizontal pin and held against up and down movement, the first mentioned fluid motor having a universal joint therein enabling said first mentioned fluid motor to swing in unison with the vertical movement of said beam and also to pivot in unison with the horizontal movement of said beam.

References Cited in the file of this patent

UNITED STATES PATENTS

| | | |
|---|---|---|
| 2,224,725 | Felt | Dec. 10, 1940 |
| 2,253,130 | Lund | Aug. 19, 1941 |
| 2,521,549 | Smith | Sept. 5, 1950 |
| 2,539,864 | Rutherford | Jan. 30, 1951 |
| 2,601,380 | Flory | June 24, 1952 |
| 2,660,104 | Rutherford | Nov. 24, 1953 |
| 2,753,145 | Rosebrook | July 3, 1956 |